(12) United States Patent
Kalapatapu et al.

(10) Patent No.: US 12,373,582 B2
(45) Date of Patent: Jul. 29, 2025

(54) PRIVACY POLICY-DRIVEN EMOTION DETECTION

(71) Applicant: Cisco Technology, Inc., San Jose, CA (US)

(72) Inventors: Pallavi Kalapatapu, San Jose, CA (US); Ali Payani, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 295 days.

(21) Appl. No.: 17/720,078

(22) Filed: Apr. 13, 2022

(65) Prior Publication Data
US 2023/0058385 A1 Feb. 23, 2023

Related U.S. Application Data

(60) Provisional application No. 63/233,824, filed on Aug. 17, 2021.

(51) Int. Cl.
*G06F 21/60* (2013.01)
(52) U.S. Cl.
CPC .................... *G06F 21/604* (2013.01)
(58) Field of Classification Search
CPC ................................................. G06F 21/604
See application file for complete search history.

(56) References Cited

U.S. PATENT DOCUMENTS

| | | |
|---|---|---|
| 2014/0282825 A1 | 9/2014 | Bitran et al. |
| 2015/0242679 A1 | 8/2015 | Naveh |
| 2017/0367634 A1 | 12/2017 | Wouhaybi et al. |
| 2018/0048599 A1* | 2/2018 | Arghandiwal ........ H04L 51/216 |
| 2020/0064146 A1* | 2/2020 | Kitajima ............ G01C 21/3608 |
| 2020/0227036 A1 | 7/2020 | Miller et al. |
| 2021/0194927 A1 | 6/2021 | Adel et al. |
| 2021/0352050 A1* | 11/2021 | Kurylko .............. H04L 63/0428 |
| 2023/0197279 A1* | 6/2023 | Yamamoto ............... G06N 3/08 |
| 2023/0410506 A1* | 12/2023 | Norieda ................. H04N 21/24 |

OTHER PUBLICATIONS

Aloufi, R. et al (2019, September) Emotion Filtering at the Edge. In arvix.org 6 pages.

* cited by examiner

*Primary Examiner* — Kevin Bechtel
*Assistant Examiner* — Forrest L Carey
(74) *Attorney, Agent, or Firm* — Lee & Hayes, P.C.

(57) ABSTRACT

This disclosure describes techniques for protecting privacy of a user with respect to emotion detection via a computer network. The techniques may include receiving sensed data associated with a user. A privacy policy of the user may be used with processing of the sensed data. For example, based at least in part on the privacy policy, a private subset of the sensed data may be filtered from remaining sensed data. The remaining sensed data may be used to determine an emotion classification result. The emotion classification result may indicate a sharable emotion of the user, for instance.

20 Claims, 12 Drawing Sheets

PRIVACY POLICY-DRIVEN EMOTION DETECTION

RELATED APPLICATIONS

This Application claims priority to U.S. Provisional Patent Application No. 63/233,824, filed Aug. 17, 2021, which is incorporated herein by reference.

TECHNICAL FIELD

The present disclosure relates generally to emotion detection using a computer network, including applying a privacy policy to the detection and/or processing of emotion information.

BACKGROUND

As artificial intelligence (AI)/machine learning (ML) continues to progress, it now becomes possible to deploy emotion sensing, mood detection, and/or other forms of human behavior analytics to a variety of technologies and use cases. For instance, self-driving cars may leverage emotion sensing to decide when to take over control from a driver. In other cases, emotion sensing can be used to gather information about a healthcare patient, automatically. To date, however, an all-or-nothing approach has been taken with respect to user privacy in emotion sensing systems.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

DESCRIPTION OF EXAMPLE EMBODIMENTS

Overview

Figure 1A:
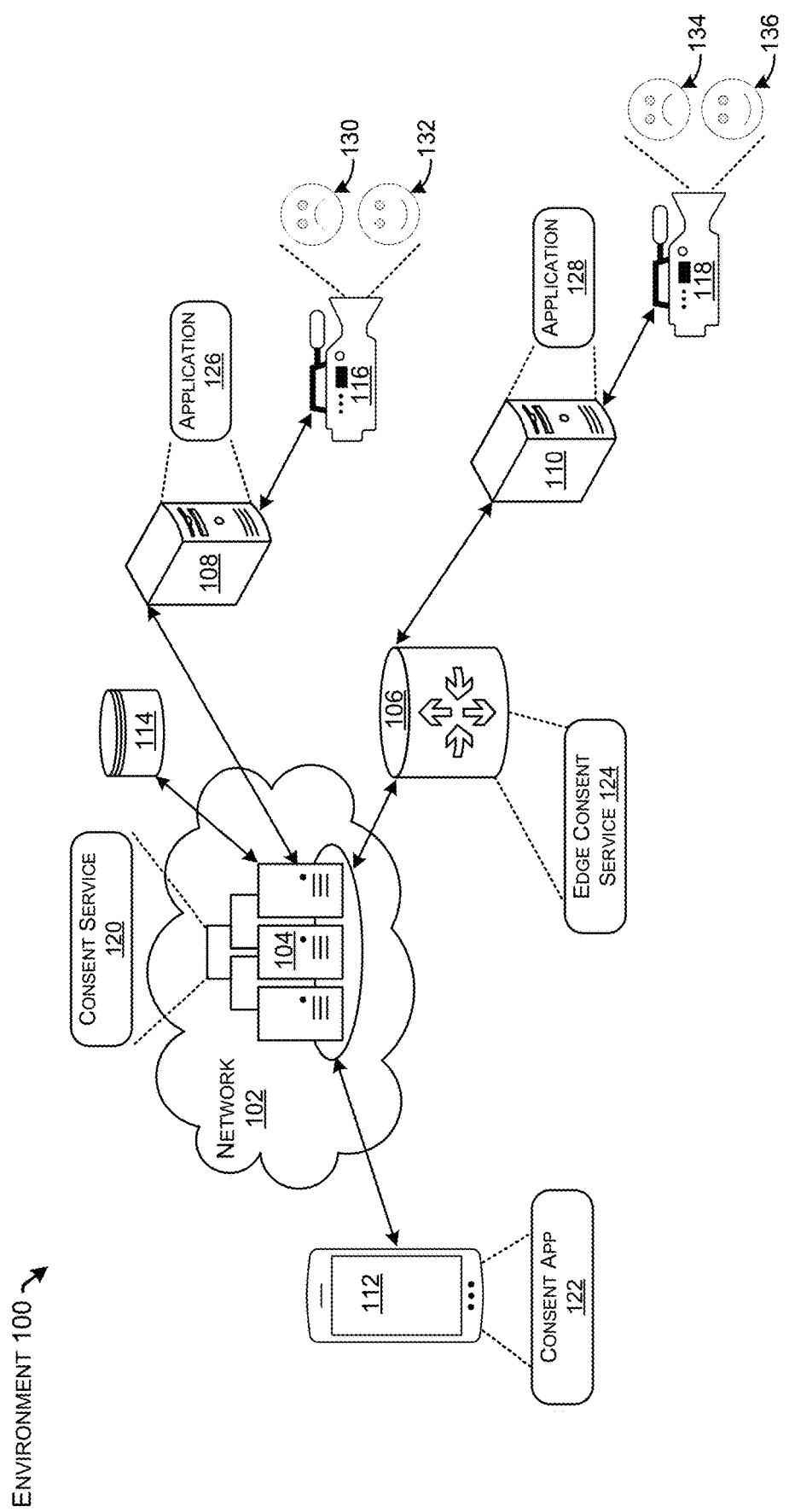
FIGS. 1A-1C illustrate component diagram(s) with an example environment in which privacy policy-driven emotion detection may be employed as part of communications between network devices, in accordance with the present concepts.

This disclosure describes, at least in part, a method that may be implemented by a server device communicatively coupled to a user device, an application server, and/or an edge device. The method may include receiving sensed data associated with a user. The method may include accessing a privacy policy of the user. The privacy policy may be associated with a first emotion of the user, for instance. The method may also include causing processing of the sensed data of the user. Based at least in part on the privacy policy, the processing may comprise determining a private subset of the sensed data. In some examples, the private subset of the sensed data may correspond to the first emotion of the user. The processing may also comprise filtering the private subset of the sensed data of the user from remaining sensed data of the user. In some examples, the processing may also comprise determining an emotion classification result using the remaining sensed data. The emotion classification result may indicate a second emotion of the user, for instance. Further, the method may include sending the emotion classification result, indicating the second emotion of the user, to a remote device.

This disclosure also describes, at least in part, another method that may be implemented by a server device communicatively coupled to a user device, an application server, and/or an edge device. The method may include receiving filtered, sensed data. The filtered, sensed data may correspond to emotion information of a user. The method may include accessing a privacy policy of the user. The privacy policy may be associated with the emotion information of the user, for instance. Based at least in part on the privacy policy, the method may also include classifying the filtered, sensed data to produce an emotion classification result. In some examples, the emotion classification result may indicate a sharable emotion of the user. The method may further include generating a report including a data visualization of the emotion classification result. Finally, the method may include sending the report to a remote device for display of the data visualization of the emotion classification result.

Additionally, the techniques described herein may be performed by a system and/or device having non-transitory computer-readable media storing computer-executable instructions that, when executed by one or more processors, performs the method described above.

Example Embodiments

This disclosure describes techniques for applying a privacy policy towards emotion detection and/or processing using a computer network. For example, a computer network may be used to sense one or more human emotions, producing captured emotion information. However, use of the captured emotion information may present a privacy issue for a user. To prevent unwanted use of captured emotion information, this disclosure includes techniques for controlling the capture and/or the use of the emotion information. For instance, a user may apply a privacy policy to control how their emotion information is collected and/or used. In one implementation, a user-defined privacy policy may prevent detection of a specified emotion under certain conditions, for instance.

Emotion sensing is becoming increasingly robust, with the potential for its use in a large variety of verticals. As used herein, "emotion" may generally refer to a variety of human emotions, moods, and/or behaviors. Consider the use case of emotion sensing of a driver of a vehicle. An emotion sensing system (and/or mood/behavior detection system) may collect emotion information about the driver, such as data indicating that the driver was "happy," "sad," "angry," or "sleepy" while operating the vehicle. The captured emotion information may be consumed by a variety of different entities. For instance, the captured emotion information could be provided to the manufacturer of the vehicle, which may be interested in driver behavior related to mechanical safety issues. The captured emotion information could be provided to an automotive insurance carrier or a healthcare insurance carrier of the driver, which may be interested in adjusting an insurance rate for the driver or offering an incentive related to behavior while driving. Other, non-limited examples of use cases for emotion sensing include web conferencing, online and retail sales, advertising, employee monitoring, and the like. As emotion sensing becomes more detailed, the possibilities for monitoring users in a great variety of situations increases, and will inevitably raise privacy issues.

According to one or more embodiments of the disclosure, an affective consent engine (ACE) is introduced herein. Further, an ACE service may be associated with the ACE. The ACE service may interface with the emotion sensing system to control the operation of the emotion sensing system—to define when and/or how the emotion sensing system operates. Additionally or alternatively, the ACE service may also manage entities and/or applications that would like to access captured emotion information (e.g., via APIs). For example, at the server level, application providers wishing to use emotion information may register with the ACE service.

The ACE service may allow a user to apply a privacy policy to emotion sensing. The ACE service may feature an ACE interface via which the user may apply the privacy policy regarding emotion sensing. For instance an ACE interface may allow a user to specify which applications are allowed to use their emotion information via a mobile phone. More specifically, the ACE may allow the user to specify emotion data filters to be used by the emotion sensing system, potentially on a per-application basis. In other words, the ACE may allow the user to specify which emotions the system is allowed to capture and under which conditions, and may vary the settings depending on the application. The user may be able to maintain a privacy profile with selected settings in the ACE interface. For instance, a user may specify to the ACE service that all emotions should be masked off (filtered out), with the exceptions of "happy" and "sleepy," for a particular application.

The ACE service may be able to apply a mask to emotion information based on the user-specified privacy profile. For example, the mask may prevent the release and/or processing of emotion information designated private by the user. The mask may be applied in the cloud, at an edge device, and/or at another device. The masking may also split the data between cloud, edge, and/or other locations, so that the emotion information is not held at one location, potentially improving security for the emotion information. Also, the emotion information may be reported in various ways, to the applications and/or to the user. As such, the ACE service may act as a cross-application service that manages and controls the use of emotion information, according to a user-specified privacy profile.

Although the examples described herein may refer to a consent service location on a cloud computing device and/or an edge device, the techniques can generally be applied to any device in a network. Further, the techniques are generally applicable for any network of devices managed by any entity where virtual resources are provisioned. In some instances, the techniques may be performed by software-defined networking (SDN), and in other examples, various devices may be used in a system to perform the techniques described herein. The devices by which the techniques are performed herein are a matter of implementation, and the techniques described are not limited to any specific architecture or implementation.

The techniques described herein provide various improvements and efficiencies with respect to network communications. For instance, the techniques described herein may reduce the amount of computational resource use, storage, dropped data, latency, and other issues experienced in networks due to lack of network resources, overuse of network resources, issues with timing of network communications, and/or improper routing of data. By improving network communications across a network, overall performance by servers and virtual resources may be improved.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1B:
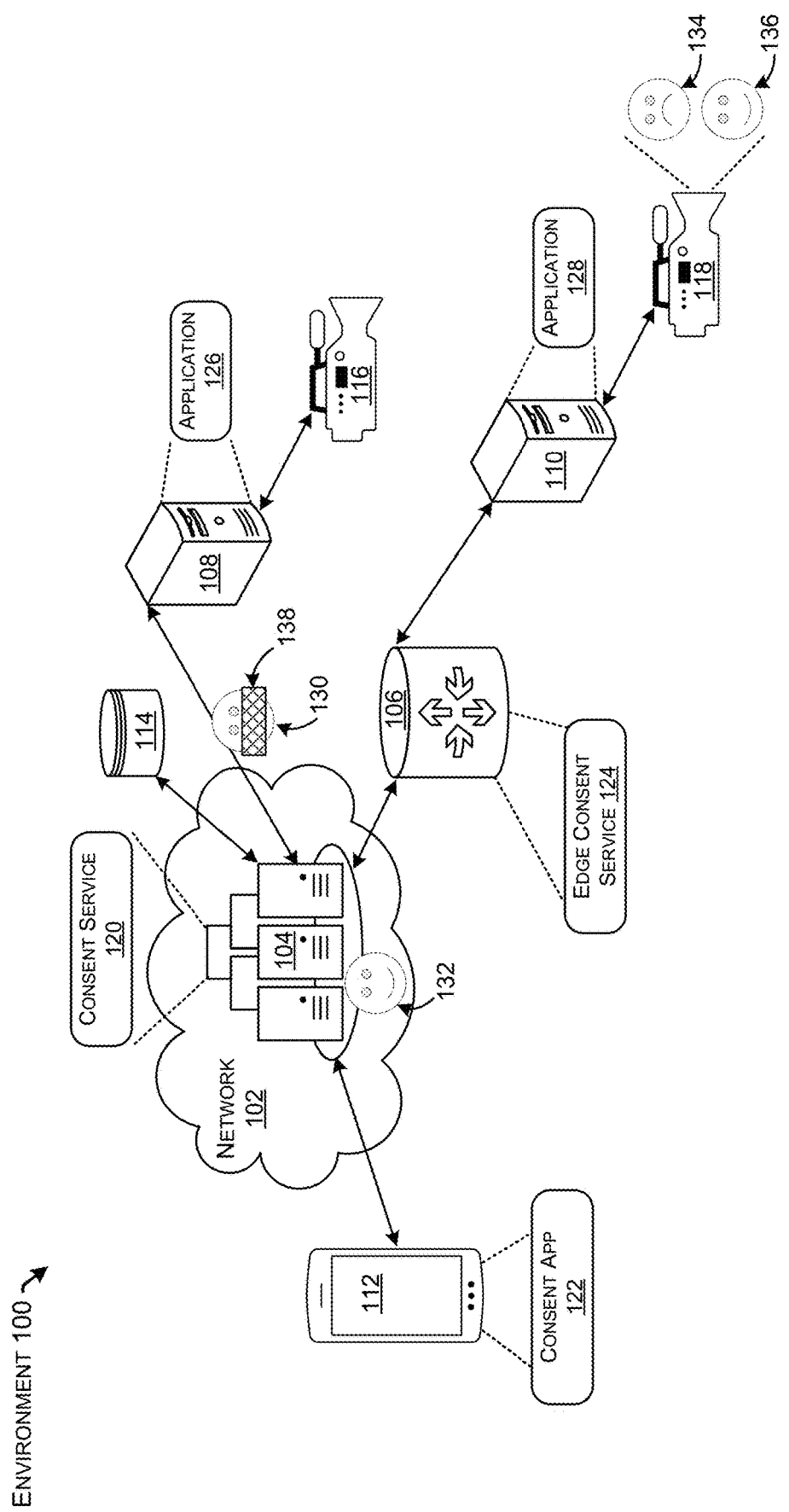
Figure 1C:
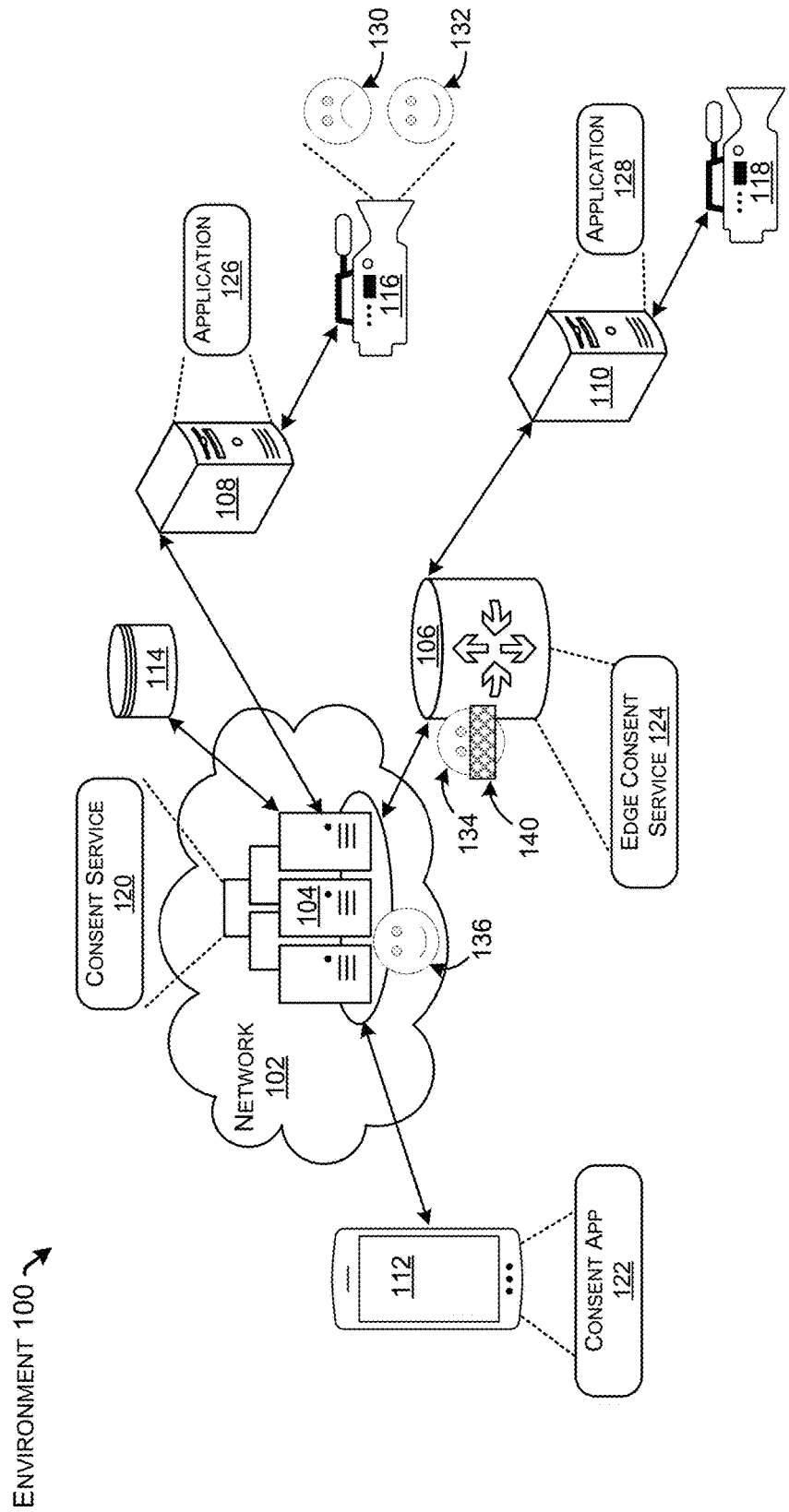

FIGS. 1A-1C collectively illustrate an example environment 100 in accordance with the present privacy policy-driven emotion detection concepts. Example environment 100 may include a cloud computing network 102, computing resources 104 (e.g., servers, one or more server devices), an edge device 106 (e.g., router), application servers 108 and 110, a user device 112, a database 114, and/or emotion sensing devices 116 and 118. The types of devices depicted in the example environment 100 of FIGS. 1A-1C are for illustration purposes and not meant to be limiting. For instance, user device 112 is depicted as a mobile phone-type device, but could also be any of a variety of user devices, such as a laptop computer, a tablet device, etc.

FIGS. 1A-1C show several examples of applications and/or services that may be located on and/or associated with various devices of example environment 100. For instance, example environment 100 may include a consent service 120 (e.g., consent engine) located at computing resources 104, a consent application 122 located at user device 112, an edge consent service 124 located at edge device 106, and applications 126 and 128 located on application servers 108 and 110, respectively.

The devices of environment 100 may be communicatively coupled to each other and/or to various other devices, via cloud computing network 102 and/or other network connections. For instance, computing resources 104 may exchange communications (e.g., packets) via a network connection(s) to edge device 106 (e.g., router), application server 108, etc.

The network connections may be transport control protocol (TCP) network connections or any network connection (e.g., information-centric networking (ICN)) that enables the computing resources 104 to exchange packets with other devices via cloud computing network 102. The network connections represent, for example, data paths between the computing resources 104 and edge device 106, application servers 108 or 110, user device 112, etc. It should be appreciated that the term "network connection" may also be referred to as a "network path." Alternatively or additionally, the data may pass through other network devices (e.g., router, switch) on a path from the application server 108 or edge device 106 to the computing resources 104. The use of a cloud computing network in this example is not meant to be limiting. Other types of networks are contemplated in accordance with privacy policy-driven emotion detection concepts.

FIGS. 1A-1C may be viewed as representing various scenarios to illustrate privacy policy-driven emotion detection concepts. The example scenarios may involve the detection of emotion information by the emotion sensing devices 116 and/or 118. For instance, referring to FIG. 1A, emotion sensing device 116 may detect emotion information associated with a private emotion 130 and/or a sharable emotion 132. In FIGS. 1A-1C, the private emotion 130 is depicted as a "sad" face (e.g., frowning), suggesting that the user may not wish to share the emotion. In contrast, the sharable emotion 132 is depicted as a "happy" face (e.g., smiling), suggesting that the user may agree to sharing the emotion. Similarly, emotion sensing device 118 may detect emotion information associated with a private emotion 134 and/or a sharable emotion 136. Note that the relative positivity or negativity of an emotion may not necessarily correspond to whether a user wishes and/or allows an emotion to be shared. Further description of private and/or sharable emotions will be provided relative to FIG. 4B, below.

In the example scenarios illustrated in FIGS. 1A-1C, emotion sensing devices 116 and 118 are depicted as a video camera-type device, suggesting capabilities for audio and video capture. It is to be appreciated that any of a wide variety of types of sensing devices may be used to collect sensed data for privacy policy-driven emotion detection purposes. For example, an emotion sensing device may include devices capable of capturing video, audio, touch, text, etc. that may be used to infer emotion(s). Additionally, multiple devices and/or multiple different types of devices may be capturing data that are used toward emotion inference in any given scenario. Further, a sensor may be associated with another device of example environment 100. For instance, emotion sensing device 116 may represent a user-facing camera or a microphone of user device 112, in some examples.

In the example scenarios illustrated in FIGS. 1A-1C, privacy policy-driven emotion detection may be performed via communications among the applications and/or services associated with the devices in example environment 100. In general, privacy policy-driven emotion detection may be viewed as cloud-based or edge-based, depending on the devices involved in the scenario. For instance, a cloud-based privacy policy-driven emotion detection scenario is depicted in FIG. 1B, and an edge-based privacy policy-driven emotion detection scenario is depicted in FIG. 1C.

As shown in FIG. 1B which depicts the example cloud-based privacy policy-driven emotion detection scenario, emotion information associated with the sharable emotion 132 may be sent by application 126 from application server 108 to computing resources 104. The emotion information may then be processed by consent service 120 via computing resources 104. Consent service 120 may represent an affective consent engine (ACE), which may include various components that process emotion information. The processing may include inferring the sharable emotion 132 of the user from the sensed data. The processing may include generating an emotion classification result that includes sharable emotion 132, for instance. The processing may include using one or more machine-learned models to infer/determine the emotion. Further description of the processing will be described below. At the application server 108, application 126 may represent an application provider, such as an automobile manufacturer, an automobile insurance carrier, or a health insurance carrier. Such an application provider may wish to use emotion information, and may register with the consent service 120. Once registered, the application provider may provide input regarding which masks may be used and/or requests for emotion information, to generate reports, to receive recommendations, to receive an emotion classification result, and/or to review compliance alerts, for instance.

FIG. 1B also shows private emotion 130 with a mask 138. Mask 138 is intended to suggest that the underlying emotion of private emotion 130 is not available to be shared. As used herein, masking an emotion may refer to excluding a portion or subset of data that corresponds to the emotion, rather than obscuring a facial image that expresses an emotion, for instance. Stated another way, mask 138 may represent that a subset of data that could be interpreted as expressing private emotion 130 may be made unavailable to some recipients. The mask (filter) may be applied to emotion information based on a privacy policy associated with the user. For instance, the application 126 and/or the consent service 120 may access use the privacy policy and/or a setting controlled by the user to enact the mask 138 of private emotion 130. Further, when a privacy policy indicates a mask, an emotion sensing system (e.g., emotion sensor 116) may apply mask 138 in real time, to prevent private emotion 130 information from being used in a certain way. For instance, in an example where the user is a driver of an automobile, even though an emotion sensing system may collect data that could identify the driver as "sad," selected settings of the driver may specify that this emotional state should be masked from being classified and/or shared with the automotive manufacturer and/or an automotive insurance carrier of the driver. Additionally, the selected settings may also allow the same information to be classified and/or shared elsewhere, such as with a healthcare insurance carrier of the driver. Therefore, the mask may represent filtering of the emotion information and/or inferred emotions depending on the recipient.

The masking of emotion information may be performed in a variety of ways with respect to timing and/or location. For instance, the emotion may be masked by preventing the collection of the sensed data in the first place. The emotion may be masked by preventing transfer of the sensed data from the application server 108 to the computing resources 104. The emotion may be masked by preventing processing of the sensed data to infer an emotion. The emotion may be masked by preventing inclusion of the emotion in an emotion classification result and/or release of emotion information from consent service 120 after the emotion is inferred from the sensed data. A wide variety of masking scenarios are envisioned for the particular timing and/or location of the masking activities. Additional detail regarding the masking process will be provided below.

As noted above, FIG. 1C depicts the example edge-based privacy policy-driven emotion detection scenario. In this scenario, emotion information associated with the sharable emotion 136 and the private emotion 134 may be sent to edge device 106 from application 128 at application server 110. Emotion information associated with the sharable emotion 136 may be processed by edge consent service 124 at edge device 106 and/or by consent service 120 at computing resources 104. The processing may include inferring the sharable emotion 136 of the user from the sensed data. The sharable emotion 136 may be delivered as part of an emotion classification result, in some examples.

However, FIG. 1C depicts private emotion 134 with a mask 140, suggesting that the underlying emotion of private emotion 134 is masked and is not available to be shared. Here again, a wide variety of masking scenarios are envisioned for the particular timing and/or location of masking activities, and the masking activities may be prescribed by a privacy policy associated with the user. For example, the emotion may be masked by preventing the collection of the sensed data in the first place. The emotion may be masked by preventing transfer of the sensed data from the application server 110 to the edge device 106. The emotion may be masked by preventing transfer of the sensed data from the edge device 106 to the computing resources 104. The emotion may be masked by preventing processing of the sensed data to infer an emotion at the edge device 106. The emotion may be masked by preventing processing of the sensed data to infer an emotion at the computing resources 104. The emotion may be masked by preventing release of emotion information from edge consent service 124 and/or consent service 120 after the emotion is inferred from the sensed data. As noted above, additional detail regarding the masking process will be provided below.

Figure 2:
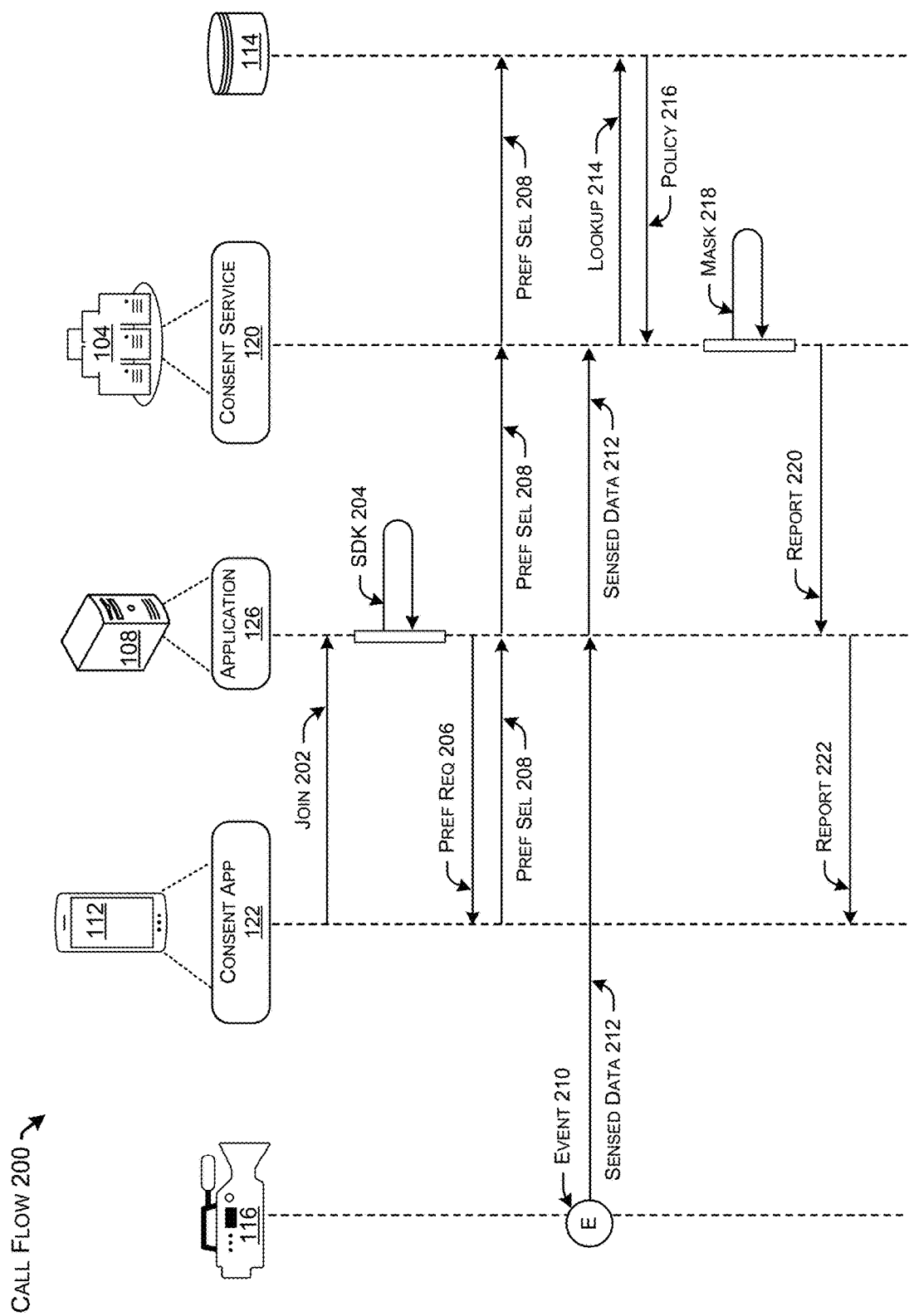
FIGS. 2 and 3 illustrate example call flow diagram(s) for example communications that relate to the component diagrams illustrated in FIGS. 1A-1C. The example communications may be employed as part of privacy policy-driven emotion detection scenarios in accordance with the present concepts.
Figure 3:
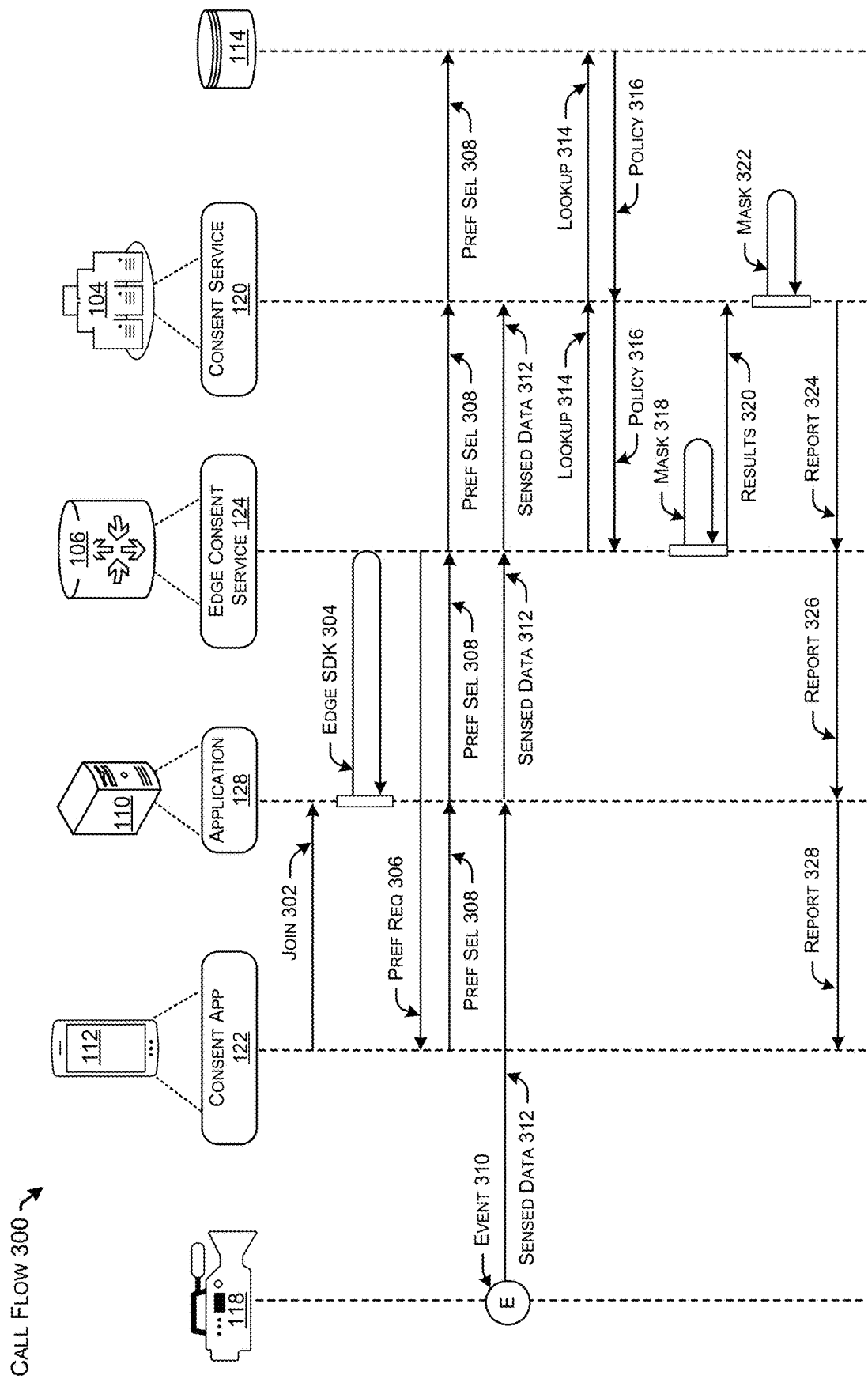

FIGS. 2 and 3 illustrate example call flows in accordance with the present privacy policy-driven emotion detection concepts. FIG. 2 illustrates an example call flow 200 associated with the cloud-based privacy policy-driven emotion detection scenario of FIG. 1B. FIG. 3 illustrates an example call flow 300 associated with the edge-based privacy policy-driven emotion detection scenario of FIG. 1C. Some aspects of the examples shown in FIGS. 2 and 3 may be similar to aspects of the examples described above relative to FIGS. 1A-1C. For instance, user device 112 shown in FIG. 2 refers to user device 112 introduced in FIGS. 1A-1C. Therefore, for sake of brevity, not all elements of FIGS. 2 and 3 will be described in detail.

In example call flow 200 shown in FIG. 2, a user may interact with consent application 122 via user device 112. At Join 202, the user may participate in enrollment activities associated with the consent service 120, such as downloading the consent application 122, providing user profile information, etc.

At software development kit (SDK) 204, application 126 at application server 108 may use an SDK to set up emotion detection and/or inference capabilities, determine which emotion information to collect, etc. In some examples, the SDK may have been received from consent service 120 for the purpose of provisioning application 126 with the emotion detection and/or inference capabilities. SDK 204 may include establishing application API-driven policy. A policy may be domain specific, for instance. A policy may be stored in database 114 for access by consent service 120, in some examples. The policy may reflect the interests of the business application. For example, the policy may reflect an interest of the business in emotion information of a user that is an employee of the business. Further, the policy may reflect an interest in collection and/or classification of sensed data regarding a potential emotion exhibited by the employee. In a specific example instance, the business may be interested to know if an employee exhibits anger while driving a truck owned by the business, during work hours of the employee.

At Preference Request 206, application 126 may offer the user a chance to select settings relative to emotion detection, inference, and/or masking. For instance, a user interface associated with consent application 122 may allow the user to select default settings, select settings specific to certain applications, etc. The settings may be communicated back to application 126 at Preference Selection 208.

At Preference Selection 208, the settings and/or other profile information may be carried through from user device 112, to application 126, and to consent service 120. Furthermore, the settings and/or other profile information may also be sent by consent service 120 to database 114. Database 114 and/or other databases or storage may be used to store user profiles, user selections, privacy policies, etc. Further description regarding Preference Selection 208 is provided relative to FIGS. 4A and 4B, below.

At Event 210, sensing of a user emotion may be triggered. Emotion sensing may be triggered by a real world event, such as starting an engine of an automobile, reaching a particular speed in an automobile, or an employee arriving at work. In other cases, emotion sensing may not be triggered by a specific event, but may be scheduled to occur at a particular time of day. Regardless, at sensed data 212, data collection by sensing device 116 may be sent to application server 108. The data may include video, audio, text, contextual information (e.g., location, time of day, weather), etc. The data may be real-time or recorded/stored. The data may be directly related to the user (e.g., video of the user's face), or may be indirectly related, such as environmental information or historical information relevant to the user or a setting or activity of the user. The sensed data 212 may be passed along to the consent service 104.

At Lookup 214, consent service 120 may access user profile or other account information of the user at database 114. For instance, consent service 120 may access privacy settings of the user (provided as Preference Selection 208) regarding a particular emotion or a particular application. Further, consent service 120 may access a privacy policy that corresponds to application 126 (business application API-driven policy that is domain specific, provided during SDK 204, for instance). At Policy 216, consent service 120 may receive the policy and/or privacy profile information.

At Mask 218, consent service 120 may apply a mask to the sensed data 212. The mask may filter out certain data, inferred emotions, or other information according to the applicable privacy policy or user profile corresponding to the situation. Further description regarding Mask 218 will be provided below.

At Report 220, consent service may provide masked, inferred emotion information to application 126. At Report 222, consent service may provide masked, inferred emotion information to application 126. Report 220 or 222 may correspond to a variety of report formats, such as data, an emotion classification result, a specific classified emotion, charted emotion variability over time, emotion comparisons to a normal range, etc. At Report 222, consent service may provide masked, inferred emotion information to application 126. Reports 220 and 222 may represent the same or different format reports. For instance, Report 222 may represent a reporting format tailored for a user. Further description of Reports 220 and 222 will be provided relative to FIGS. 5 and 6, below.

As introduced above, FIG. 3 illustrates an example call flow 300 associated with the edge-based privacy policy-driven emotion detection scenario of FIG. 1C. Many of the communications shown in FIG. 3 are similar to the communications shown in FIG. 2, and therefore will not be described in detail.

In FIG. 3, a user may interact with consent application 122 via user device 112. At Join 302, the user may participate in enrollment activities associated with the consent service 120, such as downloading the consent application 122, providing user profile information, etc.

At edge SDK 304, application 128 at application server 110 may use an SDK to set up emotion detection and/or inference capabilities, determine which emotion information to collect, etc. Use of SDK 304 may include interaction with edge consent service 124. In some examples, the SDK may have been received at the application service from edge consent service 124 and/or from consent service 120 for the purpose of provisioning application 128 with the emotion detection and/or inference capabilities.

At Preference Request 306, edge consent service 124 may offer the user a chance to select settings relative to emotion detection, inference, and/or masking. For instance, a user interface associated with consent application 122 may allow the user to select default settings, select settings specific to certain applications, etc. The settings may be communicated back to application 128 at Preference Selection 308.

At Preference Selection 308, the settings and/or other profile information may be carried through from user device 112, to application 128, to edge consent service 124, and to consent service 120. Furthermore, the settings and/or other profile information may also be sent by consent service 120 to database 114. Database 114 and/or other databases or storage may be used to store user profiles, user selections, privacy policies, etc. Further description regarding Preference Selection 308 is provided relative to FIGS. 4A and 4B, below.

At Event 310, sensing of a user emotion may be triggered. At Sensed Data 312, data collection by sensing device 116 may be sent to application server 110. The sensed data 312 may be passed along to the edge consent service 124 and/or the consent service 120.

At Lookup 314, edge consent service 124 and/or consent service 120 may access user profile or other account information of the user at database 114. For instance, edge consent service 124 may send a request for a privacy policy regarding the scenario to consent service 120, and consent service 120 may access the privacy policy or user privacy profile information from database 114. At Policy 316, consent service 120 and/or edge consent service 124 may receive the policy and/or privacy profile information.

At Mask 318, edge consent service 124 may apply a mask to the sensed data 312. The mask may filter out certain data, inferred emotions, or other information according to an applicable privacy policy or user profile corresponding to the situation. Note that the mask applied by edge consent service 124 may correspond to a portion of the sensed data 312. In another example, mask 318 may refer to a stage of the processing of sensed data 312. At Results 320, a result of the masking process may be provided to consent service 120.

At Mask 322, consent service 120 may continue processing the emotion information. The masking may be performed on a different portion of the data than Mask 318. For example, the masking may complete an initial stage of the inference process represented by Mask 318. Stated another way, Mask 318 and Mask 322 may represent part of the sensed data 312 processing being completed by edge consent service 124, and another part of the sensed data 312 processing being completed by consent service 120. Split processing and/or masking may provide improved security and/or privacy for a user by preventing the user emotion information from being held in one location. Also, a particular way that the processing is split may be prescribed by the privacy policy. Further description regarding Mask 318 and Mask 322 will be provided below.

At Report 324, Report 326, and/or Report 328, masked, inferred emotion information may be provided to various entities, such as edge consent service 124, application 128, and/or the user via consent application 122. Further description of Reports 324, 326, and 328 will be provided relative to FIGS. 5 and 6, below.

Figure 4B:
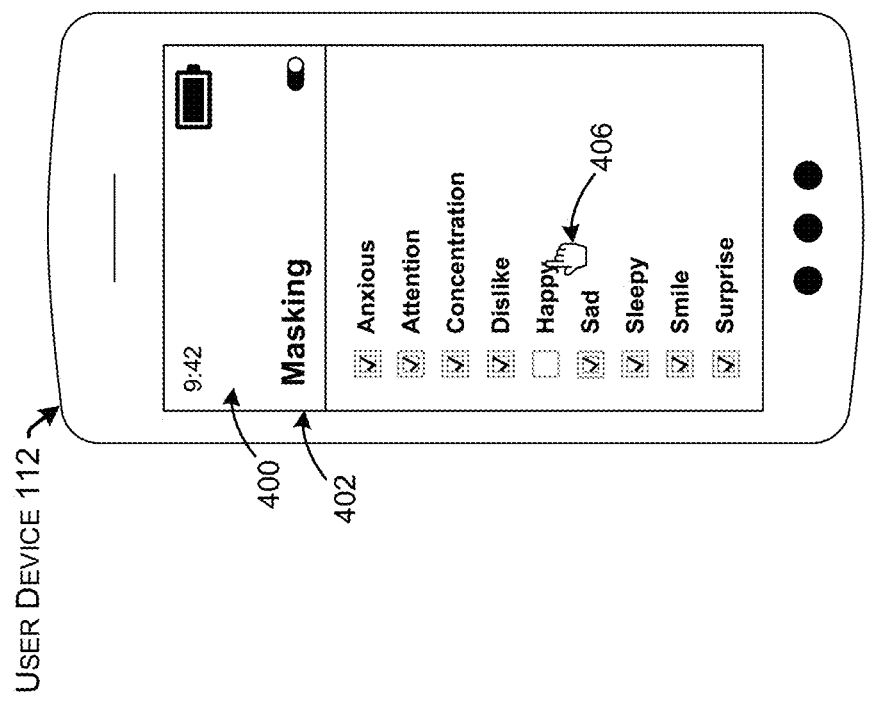
FIGS. 4A and 4B illustrate example user interface(s) that may be generated as part of a privacy policy-driven emotion detection scenario, in accordance with the present concepts.
Figure 4A:
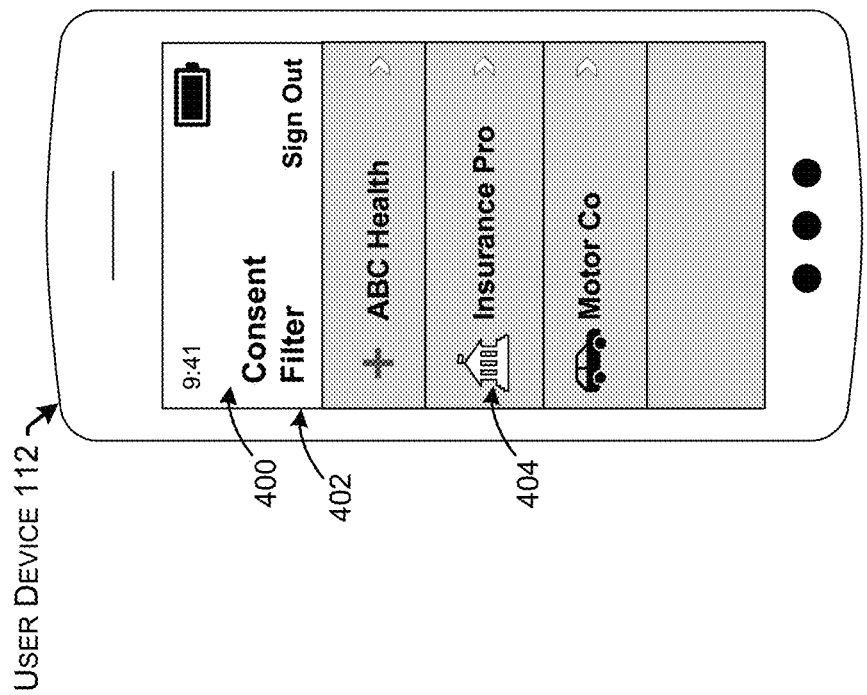

FIGS. 4A and 4B collectively illustrate an example user interface 400 in accordance with the present privacy policy-driven emotion detection concepts. As shown in FIG. 4A, user interface 400 may be displayed via display 402 of user device 112. User interface may show information related to consent application 122 (FIG. 1A), such as selectable icons for applications subscribed to the consent service 120. For instance, FIG. 4A shows a selectable icon at 404 related to an insurance carrier, which may be an automobile insurance carrier of the user. Selecting an icon for a particular application may allow the user to access further options, shown in FIG. 4B. The interaction(s) of a user with user interface 400 may be viewed as an example of Preference Selection 208 and/or 308, introduced above relative to FIGS. 2 and 3, respectively.

As shown in FIG. 4B, user interface 400 may display selectable options for turning on/off a masking feature and/or for selecting specific emotions. In FIG. 4B, a cursor 406 is shown at the emotion "happy," which has been de-selected. In this instance, the user may be indicating that all of the listed emotions are to be masked, except happy, which may be shared. The list of emotions (e.g., anxious, attention, concentration, dislike, happy, sad, sleepy, smile, surprise) shown in FIG. 4B is for illustration purposes. More, less, or different emotions may be considered for privacy policy-driven emotion detection.

Additional selectable options may be offered to a user to fine-tuning a privacy profile. In some examples, options may include content context, such as enforcing privacy regarding a particular topic, subject, activity, etc. Further, a user may be able to specify that a certain emotion is masked in context of a particular topic. In another example, masking may be time-based, such as masking one or more emotions at a certain time(s) of the day. In this example, a user may be presented with options for defining a window of private hours, which would be designated as outside the bounds for inference of emotion(s). A user may be able to establish a particular profile for private hours and a different profile for work hours, for instance. The examples presented here are not meant to be limiting, a wide variety of options for a user to create a relatively more granular privacy profile or policy are contemplated.

Figure 5:
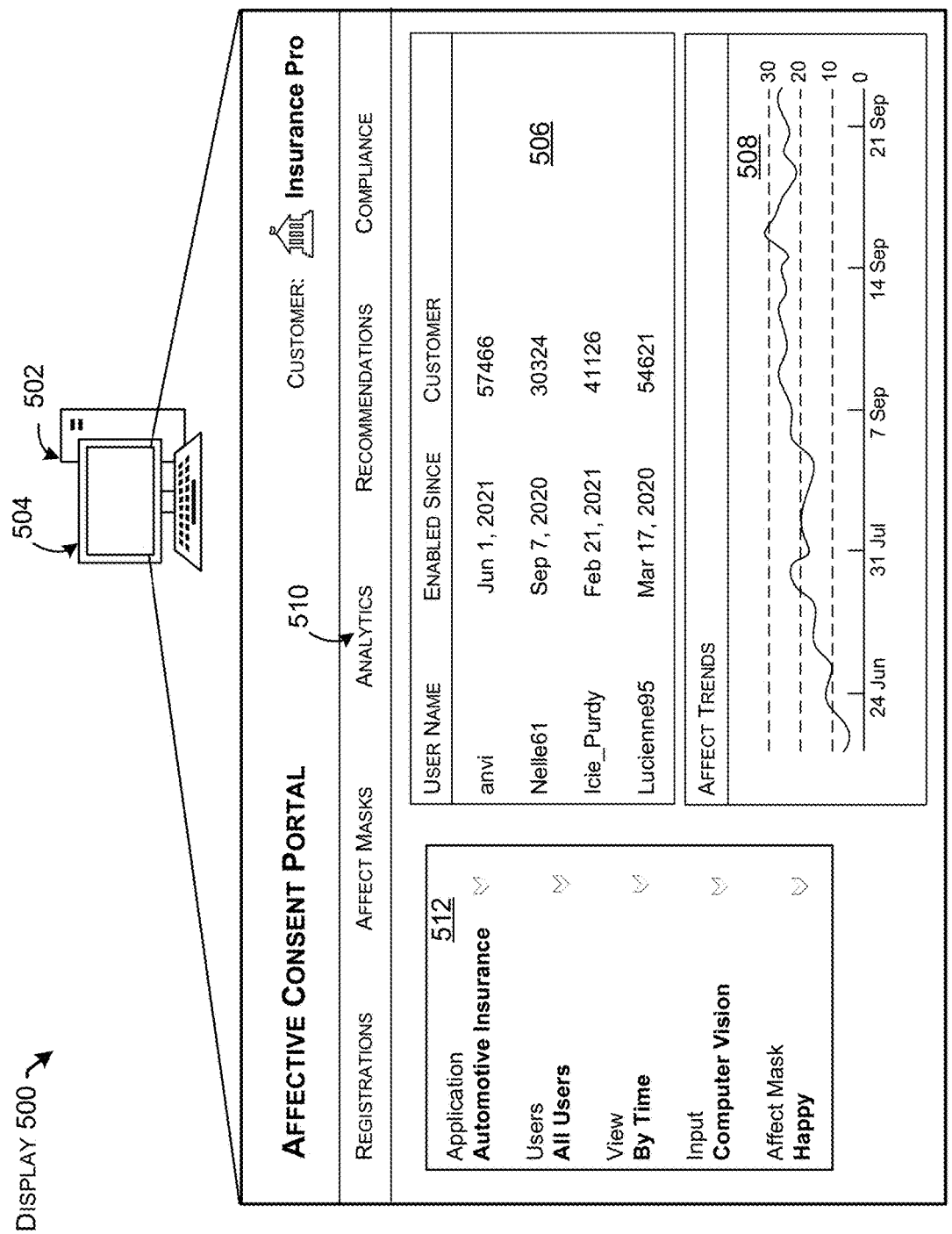
FIG. 5 illustrates an example display of an emotion classification result(s) for as a part of a privacy policy-driven emotion detection scenario, in accordance with the present concepts.
Figure 6:
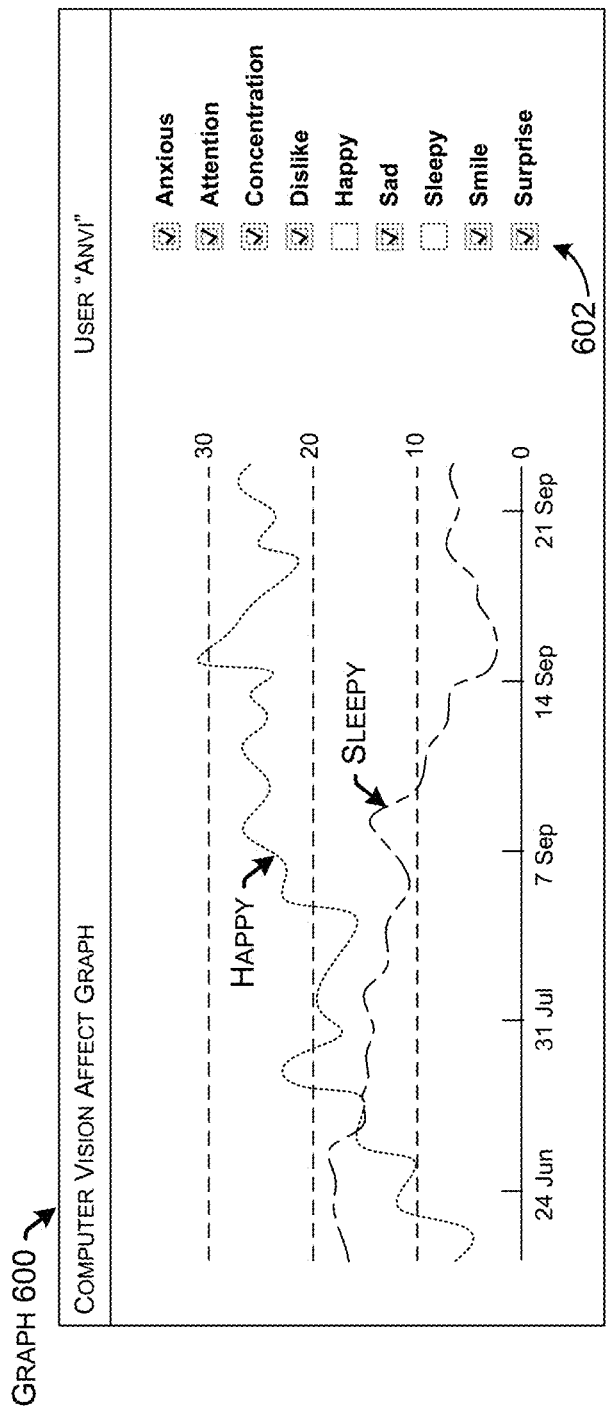
FIG. 6 illustrates an example graph of an emotion classification result(s) for as a part of a privacy policy-driven emotion detection scenario, in accordance with the present concepts.

FIG. 5 illustrates an example display 500, in accordance with the present privacy policy-driven emotion detection concepts. As shown in FIG. 5, application server 502 may generate a display 500 that may be shown via a display device 504. Application server 502 may be similar to application server 108 or 110, and display 500 may show information related to application 126 or 128. (see FIGS. 1A-1C), for instance. In some implementations, display 500 may include a variety of information relevant to a business subscribing to a consent service, such as information about particular users (chart 506), a data visualization (graph 508) of an emotion classification result, analytics of emotion information, recommendations regarding a particular state of a user, etc. The display may also be a user interface, including selectable text (indicated at 510 and 512), icons, or areas providing access to different display options, different aspects of the emotion classification result, data analysis, report information, etc. FIG. 6 illustrates an additional example graph 600, which may represent an additional example data visualization of an emotion classification result. In one example scenario, graph 600 may be selected and/or shown in display 500, for instance. Note that in example graph 600, the listed emotions (indicated at 602) reflect the masking/filtering choices provided to a user through user device 112 (see FIG. 4B). The user has masked all of the listed emotions except "happy" and "sleepy." As a result, only results for happy and sleepy are displayed in graph 600, since the other listed emotions were masked from classification. In some examples, display 500, graph 600, and/or similar emotion classification results, emotion information, data visualizations, recommendations, etc., may be examples of the type of information conveyed as Reports 220, 222, 324, 326, and/or 328 of FIGS. 2 and 3.

Referring again to FIGS. 2 and 3, following is additional description regarding masking of emotion information at the example masking steps, Mask 218, Mask 318, and/or Mask 322. In general, Mask 218, 318, and/or 322 may represent one or more methods to mask classification of one or more specific emotions. Masking may be based on a dynamic privacy business policy. Additionally or alternatively, the masking may be based on granular user consent preferences. In some examples, a neural network may be employed to learn features to classify emotions of a user. With privacy policy-driven emotion detection, privacy preferences of a user may be input to the neural network to affect the outcome, including masking of private emotions. Also, business application policy may be input to the neural network to affect the outcome regarding filtering of emotion information. Stated another way, inputs such as policy 216 (FIG. 2) or policy 316 (FIG. 3) may be fed as an additional input to the neural network.

In general, the neural network may represent one or more machine learning models, such as a supervised or unsupervised learning model. Generally, supervised learning entails the use of a training large set of data, as noted above, that is used to train the model to apply labels to the input data. For example, the training data may include images that have been labeled as depicting a particular emotion, such as 'happy,' 'sad,' 'angry,' 'pensive,' etc. On the other end of the spectrum are unsupervised techniques that do not require a training set of labels. Notably, while a supervised learning model may look for previously seen patterns that have been labeled as such, an unsupervised model may instead look to whether there are sudden changes in the behavior.

Example machine learning techniques that may be employed with privacy policy-driven emotion detection concepts may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

In privacy policy-driven emotion detection, the operation of the neural network to classify an emotion may be split into layers (e.g., stages). For instance, a deep neural network (DNN) may be employed, which may include multiple layers, such as an input layer, output layer, and/or one or more intermediary layers. With a DNN, masking may be applied by obfuscating certain extracted features in accordance to the privacy preferences at the feature extraction layers. Therefore, the downstream layers may not be able to reconstruct and/or access the original feature, thus preserving privacy. The split of the data processing among the layers of a neural network may provide an opportunity for masking of sensitive data in a variety of ways. For example, the split may resemble the separation of Mask 318 and Mask 322 as shown in FIG. 3, where an initial stage of the neural network is completed by edge consent service 124, wherein some of the data are masked, and a later stage of the neural network is completed by consent service 120 (e.g., cloud computing). The split may also be affected simply by partitioning the neural network to provide output at different stages in the process, such as with Mask 218 of FIG. 2. For example, initial (lower) layers of a neural network (e.g., Mask 218 or Mask 318) may retain feature-related data, which may be relatively unfiltered or unmasked. Meanwhile, an output layer (e.g., Mask 218 or Mask 322) may be dynamically adjusted based on the input privacy policy. Note that the split may also be affected by dividing the neural network, classification, and/or other aspects of the data processing among other devices. For instance, a feature extraction step could be performed at a user device and/or at an application server, while the classification step is performed by cloud computing resources or on an edge device, etc. In any scenario, the result may be omission of data pertaining to a class (e.g., "sad") in the output results as prescribed by the privacy policy. Thus, privacy of a user may be improved by restricting or removing the availability and/or accessibility of emotion information in the output layer and/or results.

In some examples, in the case of an omitted class, a corresponding emotion may be replaced with a system-defined custom category (e.g., "mask") to indicate to downstream applications and/or consumers that the emotion information is prohibited/held private. Stated another way, the consent service may not default a masked emotion to a neutral emotion, the system may explicitly override classification and offer a replacement designation, such as "masked," enforcing policy-driven confidentiality.

In some examples, privacy policy-driven emotion detection concepts may help improve security of emotion information for a user. For example, the split of the masking process described above may allow the consent service to better prevent data leaks from the model. The split of the masking process, with emotion information partitioned at different stages of the process and/or among different physical devices, may help guard against adversarial reconstruction and inference of omitted classes and features (e.g., emotion(s)). In some examples, the split of the masking process may be based on privacy policy input. For instance, a type or class of emotion information to be protected or a degree of sensitivity of the emotion information may prescribe where a split in the masking process should take place. In this instance, the location of the split may refer to physical location or a partition within the data, for example.

Several additional methods and examples of masking processes will now be described. It is to be appreciate that the example masking processes described above and below may be applied separately or in combination. The example masking processes may be enforced by the consent service and/or edge consent service, for example, either independently or in combination for heightened security.

In some implementations, a neural network may be split into two parts with a brute-force split (e.g., 80-20 split) approach. For instance, Mask 218 of FIG. 2 may be viewed as including two parts, a model 1 and a model 2, for instance. Such a brute-force split may offer additional protection against adversarial data access and/or leakage attacks. The lower (e.g., initial) layers of a neural network may carry a bulk of emotion information about the features, therefore splitting DNN layers in a 80-20 ratio of layers may ensure that most of the sensitive data susceptible to leakage tampering or reconstructing overriding privacy preferences are separated from the upper layers. Note that the use of 80-20 is not meant to be limiting, and other values may be used for the split, such as 75-25.

In some examples, the lower layers may be run on an edge device (e.g., edge device 106), while the upper layers may be run in the cloud (e.g., at computing resources 104) in a federated fashion (federated data native masking in data layer). For instance, as depicted in FIG. 3, a first part of the processing may be performed as Mask 318, and a second part of the processing may be performed as Mask 322. Mask 318 may represent a feature extractor for instance, while Mask 322 may represent a classifier. In this example, the edge device may be viewed as relatively more secure and/or closer to the sensed data source, considering the sensitivity of the data from an access perspective. Such a split in the masking process may tighten security of emotion features with relatively less throughput overhead. For instance, Results 320, representing data transfer between the output layers of Mask 318 and the input layers of Mask 322, may be significantly minimized, keeping data throughput overheads in check.

The splitting of a DNN may also be done by using the mechanisms of feature visualization to activate particular neurons of a neural network and create a mapping of the features versus layers. Such a method may craft an efficient cut of a DNN network based on the privacy feature encodings (e.g., privacy policy). By splitting the neural network into at least two portions at the point at which privacy encodings are applied, additional privacy and/or tamper protection from external adversarial attacks may be gained. The split may also increase robustness and scalability of the neural network. The portion of the layers succeeding the privacy encoding may be allowed to run in less secure environment as the split has already de-risked the data leakage applying privacy encodings to at the former layers. The masking process may provide a way to perform a privacy-preserving split as an alternative to brute force or random splits. For instance, the split may be performed at or close to the point where feature removal is suggested based on the privacy policy.

In some examples, training of the neural network may be adjusted to accommodate masking. For instance, a trained classification process (i.e., Mask 322 of FIG. 3) may produce one result with unaltered input data (i.e., Sensed Data 312), but may produce a different result given a masked data set (i.e., Results 320 of FIG. 3). Stated another way, a classification process may produce a different result depending on whether the data fed to the classification process were masked beforehand. It may be prohibitively resource intensive to train a neural network for any potential combination of masks and/or split of the processing steps. A variety of schemes are contemplated for reducing this training load. For instance, assuming that given any subset of emotions as the desired mask, the neural network may need to be retrained for that subset.

Note that additional security measures may be enacted by considering encryption of the emotion information at various stages of the collection, masking, and/or classification process. For instance, encryption may be performed on the sensed data, emotion information, and/or classification results. Encryption may be performed on all or part of the data, such as encryption of feature data of a user, lower layer classification results, intermediate layer results, upper layer and/or final results, etc. In some examples, encryption payload may be reduced or minimized, such as by only encrypting features specific to a sensitive class(es), which may reduce an input space.

Consider an example where a first part of a split neural network that is feature heavy is encrypted. The split network may not only communicate through secure transport, but the sensitive part of the payload may also be encrypted through homomorphic encryption schemes. A key advantage of splitting a network and applying encryption may be to reduce an input size requiring encryption by leaving the upper layers safely unencrypted. Such a reduction in an amount of data that is encrypted may provide a performance boost due to lower overhead.

In some examples, a hashing technique (e.g., local sensitivity hashing (LSH)) may be used before applying the encryption. With hashing, the encryption complexity may be further reduced by converting a floating point representation of the feature layer to a binary code via LSH, for instance. Such a method may allow the next part of the split to be directly trained.

In some implementations, a masking technique for removing certain features from a feature space may be effectively implemented via common adversarial deep learning techniques. However, such targeted masking techniques may require pre-existing knowledge regarding information that this is intended to be masked (e.g., a certain emotional state). Targeted masking may also require a training set to be at least partially labeled with respect to the desired masking features.

As an added technique, an auxiliary objective may be incorporated in a training function to reduce an amount of emotion information leakage. The auxiliary objective may be implemented as a separate loss function aimed at increasing the entropy of the representation of data at the split (the feature layer). Several possible approaches may be used for defining such a loss. One example is to assume a particular probabilistic model (e.g., Gaussian noise). The model may be encouraged to learn a representation that may have relatively minimal deviation from the random data generation model, for instance.

In some implementations, a general feature engineering platform could remove certain qualities of the representation. Stated another way, in addition to the ability of masking certain features, the model could also engineer the representation to have unbiased representation with respect to certain sensitive information, such as gender and/or race, etc. The removal of particular characteristics may be per user request.

Note that the framework described above may be applicable and generalizable to any DNN that would benefit from secure privacy feature extraction and access. Therefore the techniques have wide applicability and may not be limited to emotion sensing data alone. Any DNN that needs to operate within the privacy constraints of domain-specific privacy parameters may be able to take advantage of this system.

Figure 7:
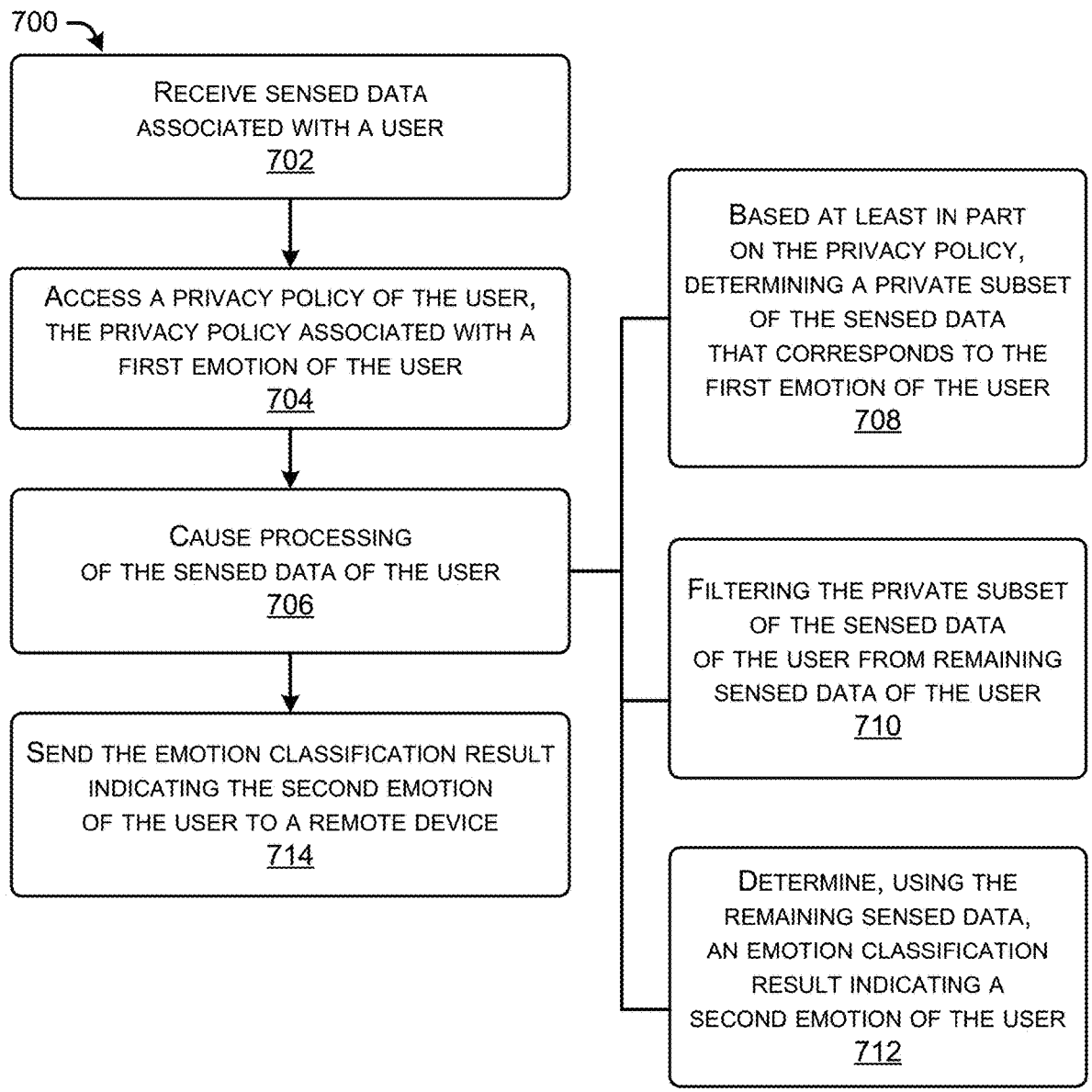
FIGS. 7 and 8 illustrate flow diagrams of example methods for the use of privacy policy-driven emotion detection techniques as a part of communications among network devices, in accordance with the present concepts.
Figure 8:
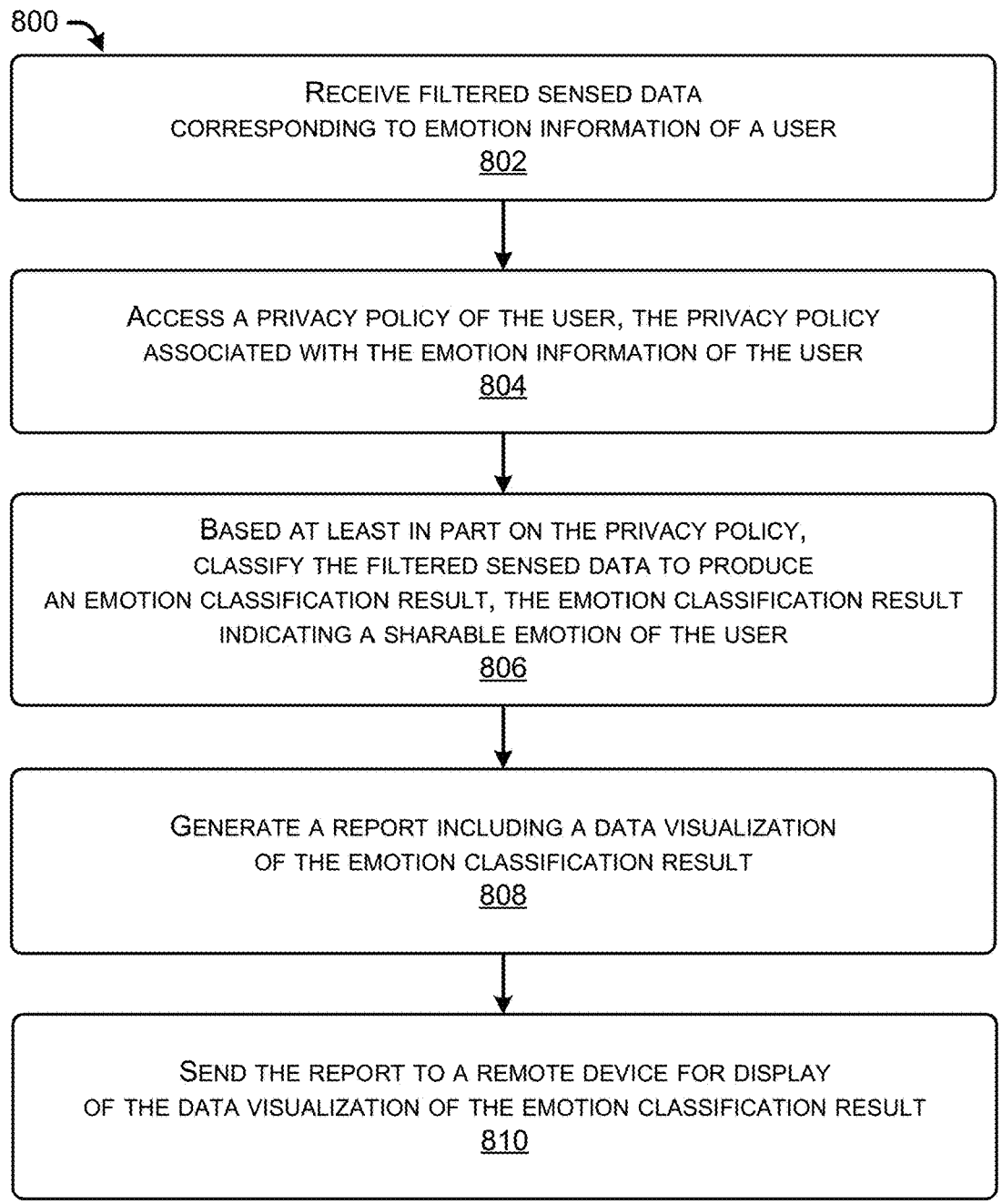

FIGS. 7 and 8 illustrate flow diagrams of example methods 700 and 800 that include functions that may be performed at least partly by a computing resource device, such as computing resources 104 or edge device 106 described relative to FIGS. 1A-3. The logical operations described herein with respect to FIGS. 7 and 8 may be implemented (1) as a sequence of computer-implemented acts or program modules running on a computing system and/or (2) as interconnected machine logic circuits or circuit modules within the computing system.

The implementation of the various devices and/or components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations might be performed than shown in the FIGS. 7 and 8 and described herein. These operations may also be performed in parallel, or in a different order than those described herein. Some or all of these operations may also be performed by components other than those specifically identified. Although the techniques described in this disclosure is with reference to specific devices, in other examples, the techniques may be implemented by less devices, more devices, different devices, or any configuration of devices and/or components.

FIG. 7 illustrates a flow diagram of an example method 700 for network devices to perform privacy policy-driven emotion detection techniques. Method 700 may be performed by a server device (e.g., computing resources 104) communicatively coupled to a user device (e.g., user device 112), an edge device (e.g., edge device 106), and/or an application server (e.g., application server 108), for instance. In some examples, method 700 may be performed by a computing device comprising one or more processors and one or more non-transitory computer-readable media storing computer-executable instructions that, when executed by the one or more processors, cause the one or more processors to perform method 700.

At 702, method 700 may include receiving sensed data. The sensed data may be associated with a user. For instance, the sensed data may include output from sensors that incorporates characteristics of the user that may indicate one or more emotions. The sensed data may correspond to visual data, audio data, biometric data, touch data, text data, etc.

At 704, method 700 may include accessing a privacy policy of the user. In some examples, the privacy policy may be associated with a first emotion of the user. Method 700 may further include receiving a user selection associated with the first emotion of the user. The user selection may refer to at least one emotion that the user would prefer to keep private, for instance. Method 700 may also include causing an indication of the user selection to be associated with the privacy policy of the user. Furthermore, method 700 may include storing the privacy policy in local storage and/or a remote database, causing the privacy policy to be associated with an account or user profile (e.g., privacy profile) of the user, etc. In some examples, the privacy policy may include an indication that the first emotion of the user is a private emotion and/or an indication that the second emotion of the user is a sharable emotion. In method 700, determining the emotion classification result may be based at least in part on the indication that the second emotion of the user is a sharable emotion, for instance.

At 706, method 700 may include causing processing of the sensed data of the user. The processing may comprise a variety of steps or operations. For instance, as shown in FIG. 7, the processing may comprise steps 708, 710, and/or 712. Accordingly, at 708, based method 700 may include determining a private subset of the sensed data that corresponds to the first emotion of the user, which may be based at least in part on the privacy policy. At 710, method 700 may include filtering the private subset of the sensed data of the user from remaining sensed data of the user. In some implementations, filtering the private subset from the remaining sensed data may be performed in conjunction with a feature extraction process. For example, the filtering may be part of the feature extraction process, or the filtering may be performed on features determined from the feature extraction process. For instance, the feature extraction process may identify features that indicate and/or are associated with the first emotion. The identified features may then be filtered out as the private subset.

Method 700 may further include causing the filtering the private subset of the sensed data to be performed at an edge device. For instance, the method may include provisioning the edge device with instructions and/or processing capabilities associated with filtering the sensed data. In this example, remaining data may be received from the edge device. The remaining data received from the edge device may exclude the private subset of the sensed data.

Additionally or alternatively, at 712, method 700 may include determining an emotion classification result. The emotion classification result may indicate a second emotion of the user. The second emotion of the user may have been indicated by the sensed data of the user, for instance. In some examples, determining the emotion classification result may comprise applying a classification process to the filtered, sensed data received from the edge device.

At 714, method 700 may include sending the emotion classification result, indicating the second emotion of the user, to a remote device. The emotion classification result may comprise a variety of data formats, such as a data visualization for display via a display device.

FIG. 8 illustrates a flow diagram of another example method 800 for network devices to perform privacy policy-driven emotion detection techniques. Method 800 may be performed by a server device (e.g., computing resources 104) communicatively coupled to a user device (e.g., user device 112), an edge device (e.g., edge device 106), and/or an application server (e.g., application server 108), for instance. In some examples, method 800 may be performed by a computing device comprising one or more processors and one or more non-transitory computer-readable media storing computer-executable instructions that, when executed by the one or more processors, cause the one or more processors to perform method 800.

At 802, method 800 may include receiving filtered, sensed data. The filtered, sensed data may correspond to emotion information of a user, in some examples. In some examples, method 800 may include causing filtering of sensed data to produce the filtered, sensed data. The filtering process may exclude a subset of the sensed data that indicates a private emotion of the user, for instance.

At 804, method 800 may include accessing a privacy policy of the user. The privacy policy may be associated with the emotion information of the user. For example, the privacy policy of the user may correspond to the private emotion of the user. The filtering process noted above may be based at least in part on the privacy policy of the user.

At 806, based at least in part on the privacy policy, method 800 may include classifying the filtered, sensed data to produce an emotion classification result. In some examples, the emotion classification result may indicate a sharable emotion of the user.

At 808, method 800 may include generating a report corresponding to the emotion classification result. For instance, the report may include a data visualization of the emotion classification result. In some examples, the report may include an indication of at least one private emotion associated with a subset of the sensed data that were filtered to produce the filtered, sensed data. For instance, the filtering may have excluded the subset from the filtered, sensed data.

At 810, method 800 may include sending the report to a remote device for display of the data visualization of the emotion classification result. For instance, the report may be sent to a user device, to an application server, and/or to other devices associated with a privacy policy-driven emotion detection scenario.

Figure 9:
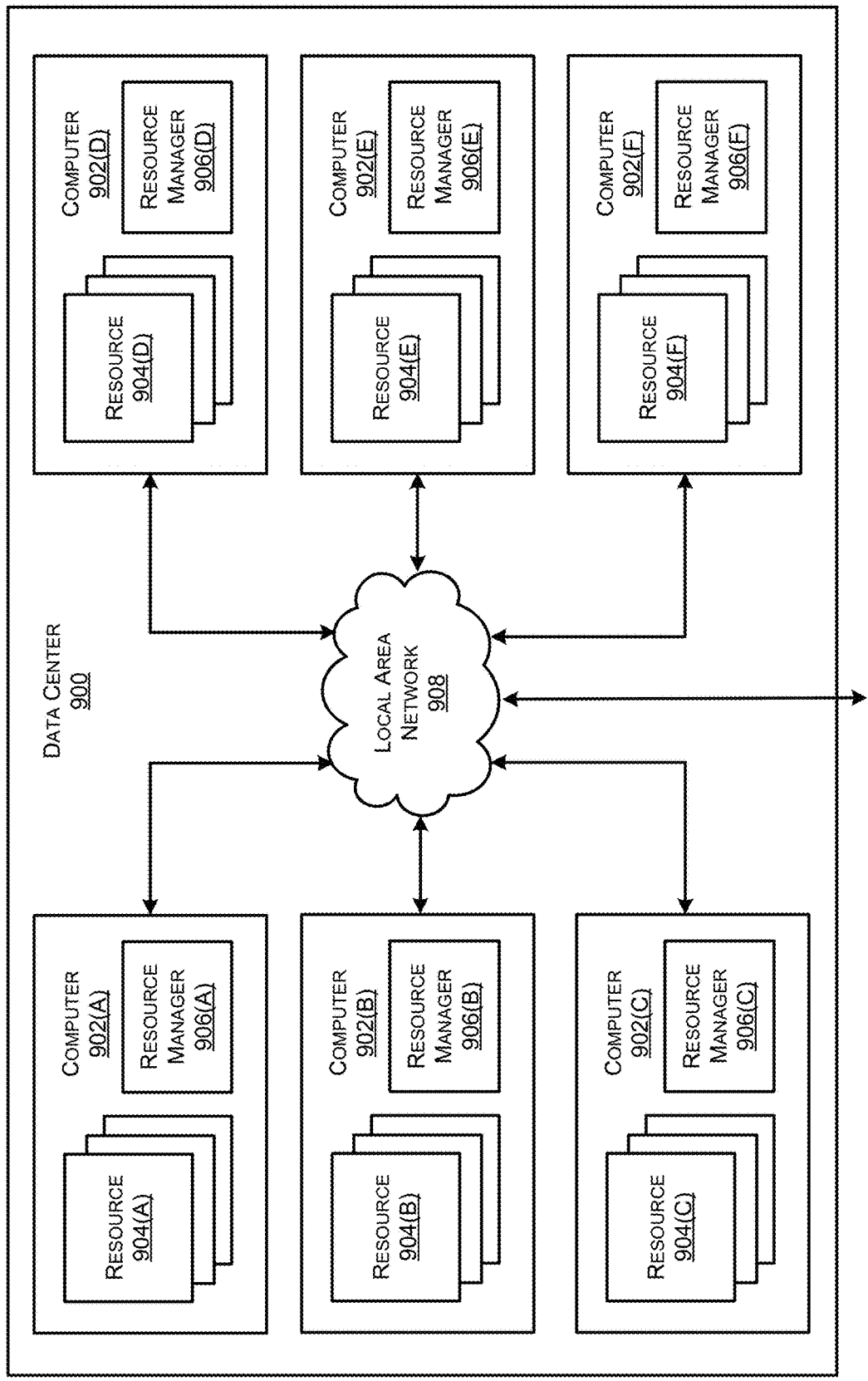
FIG. 9 illustrates a computing system diagram illustrating a configuration for a data center that can be utilized to implement aspects of the technologies disclosed herein.

FIG. 9 is a computing system diagram illustrating a configuration for a data center 900 that can be utilized to implement aspects of the technologies disclosed herein. The example data center 900 shown in FIG. 9 includes several computers 902A-902F (which might be referred to herein singularly as "a computer 902" or in the plural as "the computers 902") for providing computing resources. In some examples, the resources and/or computers 902 may include, or correspond to, any type of networked device described herein, such as computing resources 104, edge device 106, application servers 108 or 110, and/or user device 112. Although, computers 902 may comprise any type of networked device, such as servers, switches, routers, hubs, bridges, gateways, modems, repeaters, access points, hosts, etc.

The computers 902 can be standard tower, rack-mount, or blade server computers configured appropriately for providing computing resources. In some examples, the computers 902 may provide computing resources 904 including data processing resources such as virtual machine (VM) instances or hardware computing systems, database clusters, computing clusters, storage clusters, data storage resources, database resources, networking resources, and others. Some of the computers 902 can also be configured to execute a resource manager 906 capable of instantiating and/or managing the computing resources. In the case of VM instances, for example, the resource manager 906 can be a hypervisor or another type of program configured to enable the execution of multiple VM instances on a single computer 902. Computers 902 in the data center 900 can also be configured to provide network services and other types of services.

In the example data center 900 shown in FIG. 9, an appropriate local area network (LAN) 908 is also utilized to interconnect the computers 902A-902F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 900, between each of the computers 902A-902F in each data center 900, and, potentially, between computing resources in each of the computers 902. It should be appreciated that the configuration of the data center 900 described with reference to FIG. 9 is merely illustrative and that other implementations can be utilized.

In some examples, the computers 902 may each execute one or more application containers and/or virtual machines to perform techniques described herein. For instance, the containers and/or virtual machines may serve as server devices, user devices, and/or routers in the cloud computing network 102.

In some instances, the data center 900 may provide computing resources, like application containers, VM instances, and storage, on a permanent or an as-needed basis. Among other types of functionality, the computing resources provided by a cloud computing network may be utilized to implement the various services and techniques described above. The computing resources 904 provided by the cloud computing network can include various types of computing resources, such as data processing resources like application containers and VM instances, data storage resources, networking resources, data communication resources, network services, and the like.

Each type of computing resource 904 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 904 not mentioned specifically herein.

The computing resources 904 provided by a cloud computing network may be enabled in one embodiment by one or more data centers 900 (which might be referred to herein singularly as "a data center 900" or in the plural as "the data centers 900"). The data centers 900 are facilities utilized to house and operate computer systems and associated components. The data centers 900 typically include redundant and backup power, communications, cooling, and security systems. The data centers 900 can also be located in geographically disparate locations. One illustrative embodiment for a data center 900 that can be utilized to implement the technologies disclosed herein will be described below with regards to FIG. 10.

Figure 10:
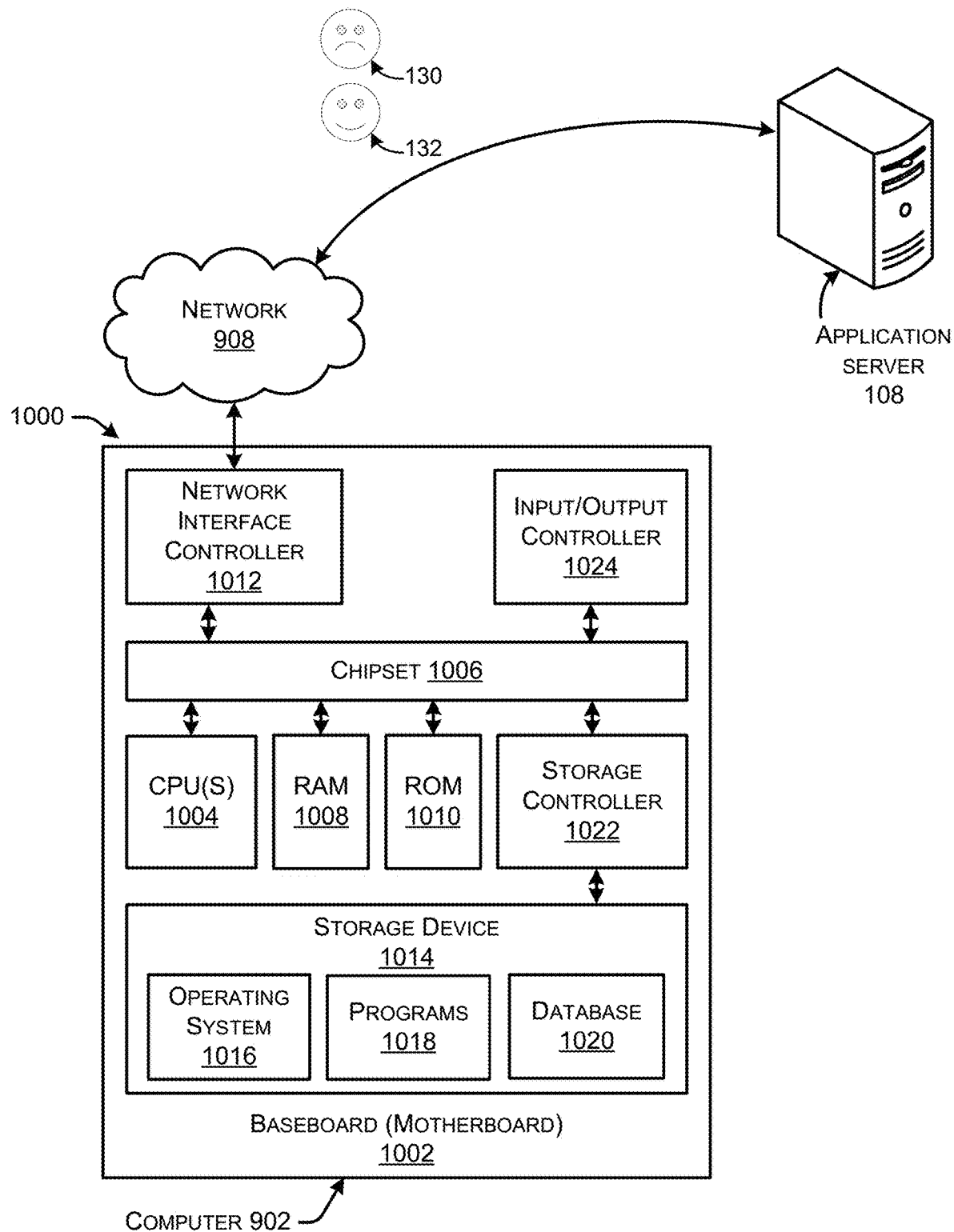
FIG. 10 is a computer architecture diagram showing an illustrative computer hardware architecture for implementing a device that can be utilized to implement aspects of the various technologies presented herein.

FIG. 10 shows an example computer architecture 1000 for a computer 902 capable of executing program components for implementing the functionality described above. The computer architecture 1000 shown in FIG. 10 illustrates a conventional server computer, workstation, desktop computer, laptop, tablet, network appliance, e-reader, smartphone, and/or other computing device, and can be utilized to execute any of the software components presented herein. The computer 902 may, in some examples, correspond to a physical device described herein (e.g., computing resources, server device, application server, edge device, user device, router, sensor device, etc.), and may comprise networked devices such as servers, switches, routers, hubs, bridges, gateways, modems, repeaters, access points, etc. For instance, computer 902 may correspond to computing resources 104.

As shown in FIG. 10, the computer 902 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 902.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 902. The chipset 1006 can further provide an interface to a computer-readable storage medium such as a read-only memory ("ROM") 1010 or non-volatile RAM ("NVRAM") for storing basic routines that help to startup the computer 902 and to transfer information between the various components and devices. The ROM 1010 or NVRAM can also store other software components necessary for the operation of the computer 902 in accordance with the configurations described herein.

The computer 902 can operate in a networked environment using logical connections to remote computing devices and computer systems through a network, such as the networks 102 and/or 908. The chipset 1006 can include functionality for providing network connectivity through a network interface controller (NIC) 1012, such as a gigabit Ethernet adapter. The NIC 1012 is capable of connecting the computer 902 to other computing devices over the network 908. For instance, in the example shown in FIG. 10, NIC 1012 may help facilitate transfer of data, packets, emotion information, emotion classification results, reports, and/or communications, such as private emotion 130 and/or sharable emotion 132, over the network 908 with another device, such as application server 108. It should be appreciated that multiple NICs 1012 can be present in the computer 902, connecting the computer to other types of networks and remote computer systems.

The computer 902 can be connected to a storage device 1014 that provides non-volatile storage for the computer. The storage device 1014 can store an operating system 1016, programs 1018, a database 1020 that may include one or more privacy policies, and/or other data. The storage device 1014 can be connected to the computer 902 through a storage controller 1022 connected to the chipset 1006, for example. The storage device 1014 can consist of one or more physical storage units. The storage controller 1022 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 902 can store data on the storage device 1014 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1014 is characterized as primary or secondary storage, and the like.

For example, the computer 902 can store information to the storage device 1014 by issuing instructions through the storage controller 1022 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 902 can further read information from the storage device 1014 by detecting the physical states or characteristics of one or more particular locations within the physical storage units.

In addition to the mass storage device 1014 described above, the computer 902 can have access to other computer-readable storage media to store and retrieve information, such as policies, program modules, data structures, and/or other data. It should be appreciated by those skilled in the art that computer-readable storage media is any available media that provides for the non-transitory storage of data and that can be accessed by the computer 902. In some examples, the operations performed by the network 908, and or any components included therein, may be supported by one or more devices similar to computer 902. Stated otherwise, some or all of the operations performed by the network 908, and or any components included therein, may be performed by one or more computer devices 902 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, ternary content addressable memory (TCAM), and/or other optical storage, magnetic cassettes, magnetic tape, magnetic disk storage or other magnetic storage devices, or any other medium that can be used to store the desired information in a non-transitory fashion.

As mentioned briefly above, the storage device 1014 can store an operating system 1016 utilized to control the operation of the computer 902. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 1014 can store other system or application programs and data utilized by the computer 902.

In one embodiment, the storage device 1014 or other computer-readable storage media is encoded with computer-executable instructions which, when loaded into the computer 902, transform the computer from a general-purpose computing system into a special-purpose computer capable of implementing the embodiments described herein. These computer-executable instructions transform the computer 902 by specifying how the CPUs 1004 transition between states, as described above. According to one embodiment, the computer 902 has access to computer-readable storage media storing computer-executable instructions which, when executed by the computer 902, perform the various processes described above with regards to FIGS. 1A-8. The computer 902 can also include computer-readable storage media having instructions stored thereupon for performing any of the other computer-implemented operations described herein.

The computer 902 can also include one or more input/output controllers 1024 for receiving and processing input from a number of input devices, such as a keyboard, a mouse, a touchpad, a touch screen, an electronic stylus, or other type of input device. Similarly, an input/output controller 1024 can provide output to a display, such as a computer monitor, a flat-panel display, a digital projector, a printer, or other type of output device. It will be appreciated that the computer 902 might not include all of the components shown in FIG. 10, can include other components that are not explicitly shown in FIG. 10, or might utilize an architecture completely different than that shown in FIG. 10.

As described herein, the computer 902 may comprise one or more devices, such as computing resources 104, edge device 106, application servers 108 or 110, user device 112, and/or other devices. The computer 902 may include one or more hardware processors 1004 (processors) configured to execute one or more stored instructions. The processor(s) 1004 may comprise one or more cores. Further, the computer 902 may include one or more network interfaces configured to provide communications between the computer 902 and other devices, such as the communications described herein as being performed by computing resources 104, edge device 106, application servers 108 or 110, user device 112, and/or other devices. In some examples, the communications may include data, packet, emotion information, emotion classification results, and/or other information transfer, for instance. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 1018 may comprise any type of programs or processes to perform the techniques described in this disclosure in accordance with privacy policy-driven emotion detection techniques. For instance, the programs 1018 may cause the computer 902 to perform techniques for communicating with other devices using any type of protocol or standard usable for determining connectivity. Additionally, the programs 1018 may comprise instructions that cause the computer 902 to perform the specific techniques for privacy policy-driven emotion detection.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A server device comprising:
one or more processors; and
one or more non-transitory computer-readable media storing computer-executable instructions that, when executed by the one or more processors, cause the one or more processors to:
access a privacy policy of a user, the privacy policy associated with a first emotion of the user;
based at least in part on the privacy policy, determine a mask related to the first emotion of the user;
in an initial stage of an emotion inference process, apply the mask to filter out a private subset of sensed data that corresponds to the first emotion of the user, creating filtered sensed data, the filtered sensed data corresponding to a second emotion of the user;
in a subsequent stage of the emotion inference process, determine, using the filtered sensed data, an emotion classification result indicating the second emotion of the user; and
send the emotion classification result indicating the second emotion of the user to a remote device.

2. The server device of claim 1, wherein the computer-executable instructions further cause the one or more processors to:
cause the applying the mask to filter out the private subset of the sensed data corresponding to the first emotion to be performed at an edge device; and
receive the filtered sensed data corresponding to the second emotion from the edge device, the filtered sensed data excluding the private subset of the sensed data corresponding to the first emotion.

3. The server device of claim 2, wherein the applying the mask to filter out the private subset of the sensed data corresponding to the first emotion is performed in conjunction with a feature extraction process.

4. The server device of claim 2, wherein determining the emotion classification result comprises applying a classification process to the filtered sensed data received from the edge device.

5. The server device of claim 2, wherein causing the applying the mask to filter out the private subset of the sensed data to be performed at the edge device comprises provisioning the edge device with processing capabilities associated with filtering the private subset.

6. The server device of claim 1, wherein the computer-executable instructions further cause the one or more processors to:
receive a user selection associated with the first emotion of the user; and
cause an indication of the user selection to be associated with the privacy policy of the user.

7. The server device of claim 1, wherein the mask to filter out the private subset of the sensed data that corresponds to the first emotion of the user is applied in the initial stage of the emotion inference process before determination of the emotion classification result indicating the second emotion of the user in the subsequent stage of the emotion inference process.

8. The server device of claim 7, wherein the mask is applied in the initial stage of the emotion inference process at an edge device, and the determination of the emotion classification result indicating the second emotion of the user is made in the subsequent stage of the emotion inference process at the server device.

9. A computer-implemented method comprising:
accessing a privacy policy of a user, the privacy policy associated with a first emotion of the user;
based at least in part on the privacy policy, determining a mask related to the first emotion of the user;
in an initial stage of an emotion inference process, applying the mask to filter out a private subset of sensed data that corresponds to the first emotion of the user, creating filtered sensed data, the filtered sensed data corresponding to a second emotion of the user;
in a subsequent stage of the emotion inference process, determining, using the filtered sensed data, an emotion classification result indicating the second emotion of the user; and
sending the emotion classification result indicating the second emotion of the user to a remote device.

10. The computer-implemented method of claim 9, further comprising:
causing the applying the mask to filter out the private subset of the sensed data corresponding to the first emotion to be performed at an edge device; and
receiving the filtered sensed data corresponding to the second emotion from the edge device, the filtered sensed data excluding the private subset of the sensed data corresponding to the first emotion.

11. The computer-implemented method of claim 10, wherein the applying the mask to filter out the private subset of the sensed data corresponding to the first emotion is performed in conjunction with a feature extraction process.

12. The computer-implemented method of claim 10, wherein the determining the emotion classification result comprises applying a classification process to the filtered sensed data received from the edge device.

13. The computer-implemented method of claim 10, wherein the causing the applying the mask to filter out the private subset of the sensed data to be performed at the edge device comprises provisioning the edge device with processing capabilities associated with filtering the private subset.

14. The computer-implemented method of claim 9, further comprising:
receiving a user selection associated with the first emotion of the user; and
causing an indication of the user selection to be associated with the privacy policy of the user.

15. The computer-implemented method of claim 9, wherein the mask to filter out the private subset of the sensed data that corresponds to the first emotion of the user is applied in the initial stage of the emotion inference process before determination of the emotion classification result indicating the second emotion of the user in the subsequent stage of the emotion inference process.

16. The computer-implemented method of claim 15, wherein the mask is applied in the initial stage of the emotion inference process at an edge device, and the determination of the emotion classification result indicating the second emotion of the user is made in the subsequent stage of the emotion inference process at a server device.

17. One or more non-transitory computer-readable media storing instructions that, when executed, cause one or more processors to perform operations comprising:
accessing a privacy policy of a user, the privacy policy associated with a first emotion of the user;
based at least in part on the privacy policy, determining a mask related to the first emotion of the user;
in an initial stage of an emotion inference process, applying the mask to filter out a private subset of sensed data that corresponds to the first emotion of the user, creating filtered sensed data, the filtered sensed data corresponding to a second emotion of the user;
in a subsequent stage of the emotion inference process, determining, using the filtered sensed data, an emotion classification result indicating the second emotion of the user; and
sending the emotion classification result indicating the second emotion of the user to a remote device.

18. The one or more non-transitory computer-readable media of claim 17, the operations further comprising:
receiving a user selection associated with the first emotion of the user; and
causing an indication of the user selection to be associated with the privacy policy of the user.

19. The one or more non-transitory computer-readable media of claim 17, wherein the mask to filter out the private subset of the sensed data that corresponds to the first emotion of the user is applied in the initial stage of the emotion inference process before determination of the emotion classification result indicating the second emotion of the user in the subsequent stage of the emotion inference process.

20. The one or more non-transitory computer-readable media of claim 19, wherein the mask is applied in the initial stage of the emotion inference process at an edge device, and the determination of the emotion classification result indicating the second emotion of the user is made in the subsequent stage of the emotion inference process is performed by the one or more processors.

* * * * *